US012431044B2

(12) United States Patent
Topcuoglu

(10) Patent No.: US 12,431,044 B2
(45) Date of Patent: Sep. 30, 2025

(54) POSTER DISPLAY DEVICE AND MANUFACTURING METHOD

(71) Applicant: M.T REKLAM ANONIM SIRKETI, Gebze / Kocaeli (TR)

(72) Inventor: Ali Topcuoglu, Istanbul (TR)

(73) Assignee: M.T REKLAM ANONIM SIRKETI, Kocaeli (TR)

( * ) Notice: Subject to any disclaimer, the term of this patent is extended or adjusted under 35 U.S.C. 154(b) by 203 days.

(21) Appl. No.: 18/276,681

(22) PCT Filed: Feb. 17, 2021

(86) PCT No.: PCT/EP2021/053878

§ 371 (c)(1),
(2) Date: Aug. 10, 2023

(87) PCT Pub. No.: WO2022/174893

PCT Pub. Date: Aug. 25, 2022

(65) Prior Publication Data

US 2024/0135842 A1 Apr. 25, 2024
US 2024/0233585 A9 Jul. 11, 2024

(51) Int. Cl.
*G09F 15/00* (2006.01)

(52) U.S. Cl.
CPC ...... *G09F 15/0018* (2013.01); *G09F 15/0012* (2013.01)

(58) Field of Classification Search
CPC ............. G09F 15/0018; G09F 15/0012; G09F 15/0062; G09F 15/02
See application file for complete search history.

(56) References Cited

U.S. PATENT DOCUMENTS

| | | | | |
|---|---|---|---|---|
| 2,075,401 | A | 3/1937 | Mosby | |
| 3,965,594 | A * | 6/1976 | Candor | G09F 15/02 40/722 |
| 5,964,052 | A * | 10/1999 | Jepsen | G09F 15/0062 40/607.1 |
| 2019/0392738 | A1* | 12/2019 | Topcuoglu | G09F 15/0012 |
| 2020/0275789 | A1* | 9/2020 | Han | G09F 7/20 |

FOREIGN PATENT DOCUMENTS

| | | | |
|---|---|---|---|
| CN | 105374299 | B | 5/2019 |
| EP | 1467339 | B1 | 6/2007 |
| EP | 2016574 | B1 | 11/2012 |
| WO | 2009130489 | A1 | 10/2009 |
| WO | 2018145741 | A1 | 8/2018 |

OTHER PUBLICATIONS

International Search Report and Written Opinion for PCT Application No. PCT/EP2021/053878, dated Nov. 15, 2021, 9 pages.

* cited by examiner

*Primary Examiner* — Gary C Hoge
(74) *Attorney, Agent, or Firm* — Dickinson Wright PLLC

(57) ABSTRACT

The invention relates to a poster display device and a method for manufacturing a poster display device. A poster display device comprises a main body, a flexible board, and an internal space for receiving a poster. The internal space is formed between the main body and the flexible board. The flexible board is removably attached to the main body by at least one plug which can be plugged into at least one plug receiver.

19 Claims, 3 Drawing Sheets

POSTER DISPLAY DEVICE AND MANUFACTURING METHOD

CROSS-REFERENCE TO RELATED APPLICATION(S)

Figure 1:
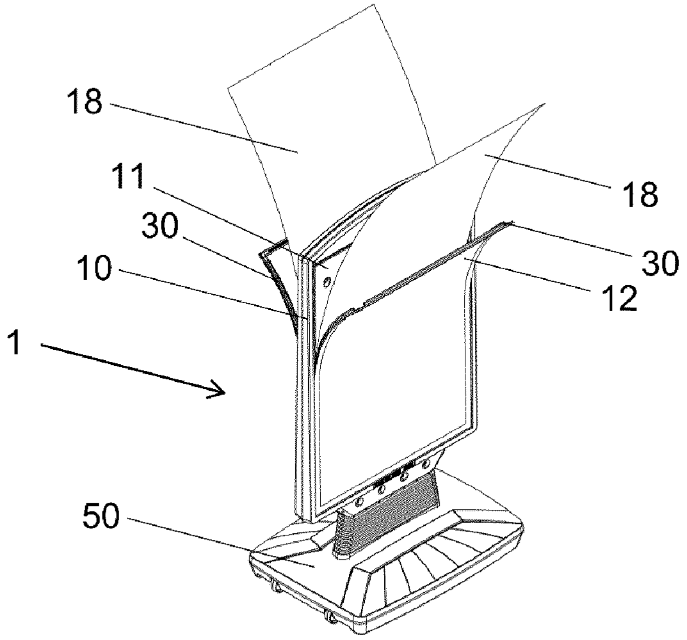

This present application is a national stage application of International Patent Application No. PCT/EP2021/053878, filed Feb. 17, 2021, the disclosure of which is hereby incorporated by reference in its entirety.

The invention relates to a poster display device and a method for manufacturing a poster display device. A poster display device is a device for holding and displaying an essentially flat item such as a banner, a poster or a comparable item. A poster display device may comprise a main body with a surface to which a poster can be attached.

Different devices are known for holding and/or displaying posters. EP 1 467 339 B1 discloses a changing frame for posters with a base plate and hinge-like retaining sections for pressing the poster to the base plate. The retaining sections are pivotable with respect to resting hinge parts which are integral with the base plate. EP 2 016 574 B1 describes a production method for an aluminum poster frame having PVC protections in which a frame body is formed as a one-piece body by means of plastic injection.

A poster display device may comprise a transparent board to protect the poster from the environment. An internal space for receiving a poster may be formed between the main body and the transparent board. The transparent board may be removably attached to the main body to allow for mounting and dismounting of a poster.

The object of the invention is to provide a further developed poster display device and a further developed production method for such a device.

The object is solved by a poster display according to claim 1 and a method according to the additional independent claim. Advantageous embodiments are given in the dependent claims.

According to the invention, a poster display device comprises a main body, a flexible board, and an internal space for receiving a poster. The internal space is formed between the main body and the flexible board. The flexible board is removably attached to the main body by at least one plug which is plugged into at least one plug receiver.

By means of the plug and the plug receiver, the flexible board is attached to the main body and the poster is held in a firm and reliable yet easily removable manner. The flexible board enables a particularly easy opening of the internal space and, thus, convenient mounting and dismounting of a poster. For removing the flexible board, the at least one plug can be plugged out (unplugged) of the plug receiver.

The main body comprises a surface to which a poster can be attached. The surface may be curved or even. At least the surface of the main body, in particular the whole main body, may be rigid. One or more standing feet may be attached to the main body in order to provide a stand-up display. Additionally or alternatively, one or more wall mounts may be attached to the main body.

The flexible board serves for protecting the poster towards the outside. Preferably, the flexible board is transparent. Typically, the flexible board defines a curved or even surface for delimiting the internal space towards the outside. The flexible board may be configured for contacting and/or holding the poster. The poster may also be held within the internal space in other ways. The thickness of the flexible board may be between 0.5 mm and 10 mm. In one configuration, the flexible board is made of a flexible plastic, in particular PET.

Flexible means that the board can be manually bent at an angle of at least 45°, in particular 90°, between two opposing ends without breaking. The flexibility enables a particularly easy handling while mounting or dismounting a poster. In interaction with the plug connection, the flexible board allows for being partly detached and bent away from the main body such that a poster can be mounted or dismounted without the need to completely remove the flexible board. Positioning of the flexible board on the main body is not necessary and a very easy mounting and dismounting of posters is possible.

The internal space serves for receiving a banner, a poster or a comparable item. The internal space may be thin, e.g. less than 5 mm or less than 1 mm. The internal space is delimited by the surface of the main body, the flexible board and by wall elements such as a first profile, if applicable.

A plug receiver is an opening or recess into which a plug can be plugged. In particular, a removable plugging is meant. The plug receiver is typically open towards the outside for a plug to be plugged in. In case of more than one plug receivers, typically all plug receivers open in parallel directions. In one configuration, the plug receiver or a plurality of plug receivers extend along or are distributed over at least 80% or at least 90% over the circumference around the internal space. This enables a regular attachment.

In one configuration, the material in which the plug receiver is formed is a thermoplastic polymer, e.g. HDPE (high-density polyethylene). In particular, the main body is made of a thermoplastic polymer, e.g. HDPE.

A plug is a protruding element configured to be plugged into the plug receiver in order to be removably fixed to the material of the plug receiver. In particular, a removable plugging is meant. A plug can have any cross-section.

The plug receiver and the plug may be arranged such that the flexible board can be completely removed. This facilitates production and cleaning of the device. At least one plug receiver and/or at least one plug may be arranged and/or distributed circumferentially around the internal space.

In one embodiment, the at least one plug is elongated. The at least one plug may extend over a great part, for example over at least 70%, of the extent of the internal space. In one embodiment, the at least one plug receiver is an elongated groove. The groove may extend over a great part, for example over at least 70%, of the extent of the internal space. These embodiments enable a continuous attachment. Thus, the flexible board is evenly attached and the poster is optimally held and protected towards the outside.

Elongated means that the respective item has a longitudinal extent which is by a factor of at least 2, in particular at least 5, greater than its width extent. Preferably, the respective item can be manufactured by extrusion. In one configuration, the plug and/or the groove extends over at least 85%, in particular at least 95%, of the extent of the internal space measured along one of its two main dimensions (height extent or width extent).

In one configuration, one groove or a plurality of grooves extend over at least 80% of the circumference. In the context of the invention, the circumference relates to the circumference around the internal space, i.e. enclosing the internal space in top view, unless otherwise indicated. In one configuration, one plug or a plurality of plugs extend over at least 80% of the circumference.

In one embodiment, the at least one plug is attached to the flexible board. In one embodiment, the main body comprises the at least one plug receiver. The plug receiver may be formed by the material of the main body. Alternatively or additionally, a component forming at least parts of the plug receiver may be attached to the main body. The technical effort during production can thus be kept low.

In one embodiment, a first profile is firmly attached to the flexible board and a second profile comprising the at least one plug is attached to the first profile. Thus, the plug is indirectly attached to the flexible board. In particular, the first profile is attached to the flexible board by means of adhesive such as a double-sided tape. This enables a firm attachment at a low effort. In particular, the first profile and the second profile are connected in a form-fit manner in at least one direction, in particular in two perpendicular directions.

In one configuration, the first profile and/or the second profile is made by extruding a plastic material. In one configuration, the first profile and/or the second profile is made of a thermoplastic polymer, e.g. PVC (polyvinyl chloride). This embodiment leads to a durable and low-effort attachment. In addition, the two profiles impede ingress of dirt and humidity.

In one embodiment, one of the first profile and the second profile has a connection section and the other one of the first profile and the second profile has a receiving space for receiving the connection section. The receiving space has a first extent in a direction essentially parallel to the flexible board. The connection section has a second extent in the direction of the first extent. The first extent is greater than the second extent.

This allows relative movement between the receiving space and the connection section, and thus between the plug or plugs which are arranged on different sides of the board, along the extension direction of the flexible board such that differences in thermal growth between the flexible board and the main body can be compensated. Thus, the device can be used at temperatures between −20° C. and 45° C.

Essentially parallel to the flexible board means essentially parallel to at least one part of the surface of the flexible board. Essentially parallel means at an angle of less than 10°, in particular less than 5° and more preferably less than 3° to the board.

The first extent may be at least 1 mm, in particular at least 2 mm longer than the second extent and/or at most 10 mm, in particular at most 5 mm longer than the second extent.

In particular, the connection section is arranged on the second profile and the receiving space is arranged on the first profile. Preferably, the respective extents are aligned perpendicular to the longitudinal direction of the respective profiles. Thus, thermal growth compensation is possible in all directions.

In one embodiment, the at least one plug is widened at or near its tip and the at least one plug receiver comprises an undercut such that the plug can be held in a form-fit manner in the plug receiver. This enables smooth plugging and unplugging at a particularly low production effort.

The plug is widened at the tip or near the tip. In particular, the plug has lateral extensions in two opposing directions at the tip, the directions being perpendicular to the main extension of the plug. The tip is the protruding or free end of the plug. In particular, at least parts of the contours of the plug and the plug receiver essentially correspond to each other. In particular, the plug receiver and/or the plug is configured to flexibly deform in such a manner that plugging and unplugging can be realized against a flexible force.

In one embodiment, the at least one plug comprises two struts and a space formed between the struts. The struts are configured to flexibly deform into the space while plugging the plug in the plug receiver or unplugging the plug from the plug receiver. In particular, the struts protrude towards the plugging direction. Attaching and detaching the flexible board is thus facilitated. The plug receiver or groove can then be rigid. This allows for a particularly low-effort plug and plug receiver construction. At the same time, a for a long service life of the attachment is enabled.

In a further embodiment, the at least one plug comprises a compressible element arranged in the space between the two struts. The compressible element is configured for exerting an outwardly-directed counter force onto the struts when the struts are pressed together. Pressing together occurs during plugging and unplugging. Through the compressible element, the plugging force can be adapted as desired and unintentional unplugging can be impeded. The attachment can thus be individually adapted. In addition, the material of the compressible element can be selected to provide the compressible properties while the struts can be optimized as low-effort and long-life items.

In a further embodiment, the struts run along the main extension direction of the plug. In other words, the struts are elongate and extend along the longitudinal extension of the plug. The profile forming the plug can thus be manufactured particularly easily, e.g. by extrusion.

In a further embodiment, the at least one plug has cutouts arranged in distances along the longitudinal direction of the plug. The cutouts are distributed, in particular evenly distributed, over the length of the plug. In particular, the cutouts are aligned essentially perpendicular to the longitudinal direction of the plug. In other words, the at least one plug is subdivided longitudinally. The cutouts can also be referred to as weakening recesses. Cutouts may separate the plug and/or the corresponding profile into several parts, i.e. they run through the whole depth of the corresponding component. Alternatively, cutouts may run over a part of the depth only. The term cutout in the sense of the invention merely refers to the shape element of a recess formed in the plug and not to the manufacturing method. Cutouts may be manufactured by a cutting process. However, cutouts may also be manufactured by any other suitable process.

The width of the cutouts may be less than 5 mm, in particular less than 3 mm. The number of cutouts per side of the device may be between 2 and 30, in particular between 4 and 12. In particular, cutouts are arranged on the right and left sides. In one configuration, cutouts are arranged on the right and left sides only but not on the top or bottom side. Preferably, the same number of cutouts is arranged on the right and left sides and in the same height positions. The cutouts are in particular open towards the plugging direction. This embodiment enables to easily bend the flexible board backwards on the upper side without the need to bend the plug. Thus, the internal space can be easily made accessible to insert a poster from above.

In one embodiment, the at least one groove has wider sections and narrower sections which alternate along the longitudinal extension of the groove. Wider and narrower sections means that a cross-section of the groove measured perpendicular to the longitudinal extension of the groove is narrower and wider in alternating sections. Depending on the section, plugging and unplugging requires more or less force. Therefore, the sections work like click stops and enable for partly plugging or unplugging the plug up to a desired position. The partly plugged or unplugged positions remain unchanged without an external load, so the poster can easily be removed or inserted and the unplugged plugs can easily be plugged in again afterwards. In particular, the wider sections and/or the narrower sections have a length of more than 5 cm, in particular more than 10 cm and more particularly more than 15 cm and/or less than 50 cm, in particular less than 40 cm and more particularly less than 30 cm. This enables a particularly convenient poster exchange.

In another embodiment, a gap is provided between the main body and the flexible board. The gap has in a least one location a gap width of at least 2 mm. This allows to insert a coin or a similar item such as a screw driver in order to pry the flexible board and remove it at least partly from the main body. Thus, the device can be opened without a tool. In an alternative configuration, the gap width is more than 1.5 mm. The gap width may be less than 6 mm, in particular less than 4 mm and more particularly less than 3 mm. The gap length of the gap may be at least 25 mm and/or at most 100 mm. A gap with a smaller width may be present adjacent to the gap along its longitudinal extension.

The gap is open towards the outside such that a coin or a similar item can be introduced from the outside for prying the flexible board. In particular, an outer frame of the main body and the flexible board are essentially flush towards the outside and a coin or a similar item can be introduced essentially perpendicular to the flexible board.

A further aspect of the invention is a method for manufacturing a poster display device. The device has a main body, a flexible board which is removably attachable to the main body, and an internal space for receiving a poster. The method comprises providing the main body, wherein the main body comprises at least one groove for receiving at least one plug, and providing a flexible board. The method comprises performing an extrusion process to form an extruded second profile having at least one plug. The method further comprises attaching the second profile to the flexible board. The plug can be plugged into the groove to form a removably attach the flexible board to the internal space.

All features, advantages and embodiments mentioned in relation to the poster display device also apply to the manufacturing method and vice versa. The extruded second profile can form the plug or be the plug. In particular, the plug is elongate and directed along the extrusion direction. The plug may comprise two struts and a space between the struts which are in particular aligned along the extrusion direction. A particularly low-effort production of the device with the mentioned advantages is thus possible.

In one embodiment, the second profile comprises a connection section. The method further comprises performing an extrusion process to form an extruded first profile comprising a receiving space. The step of attaching the second profile comprises firmly attaching the first profile to the flexible board and inserting the connection section into the receiving space to movably attach the second profile to the first profile. In particular, the receiving space has a first extent in a direction essentially parallel to the flexible board and the connection section has a second extent in the direction of the first extent, wherein the first extent is greater than the second extent.

In a further embodiment, the method further comprises removing material from the plug to provide cutouts arranged in distances along the longitudinal direction of the at least one plug. The cutouts may be provided such that they are aligned essentially perpendicular to the longitudinal direction. The material removal may be performed after the extrusion process. The material removal may be performed by cutting or sawing.

In the following, exemplary implementations of the invention are explained in more detail using figures. Features of the exemplary implementations can be combined individually or in a plurality with the claimed objects, unless otherwise indicated. The claimed scopes of protection are not limited to the exemplary implementations.

Figure 2:
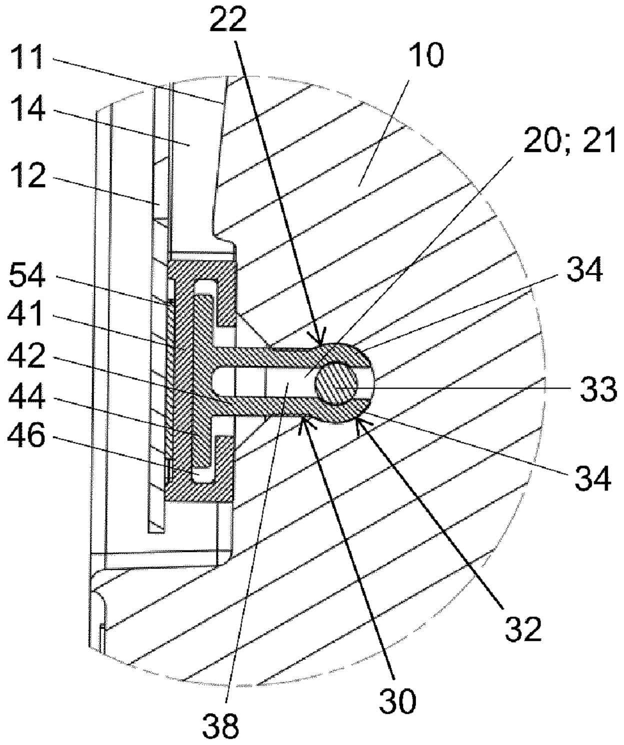
Figure 3:
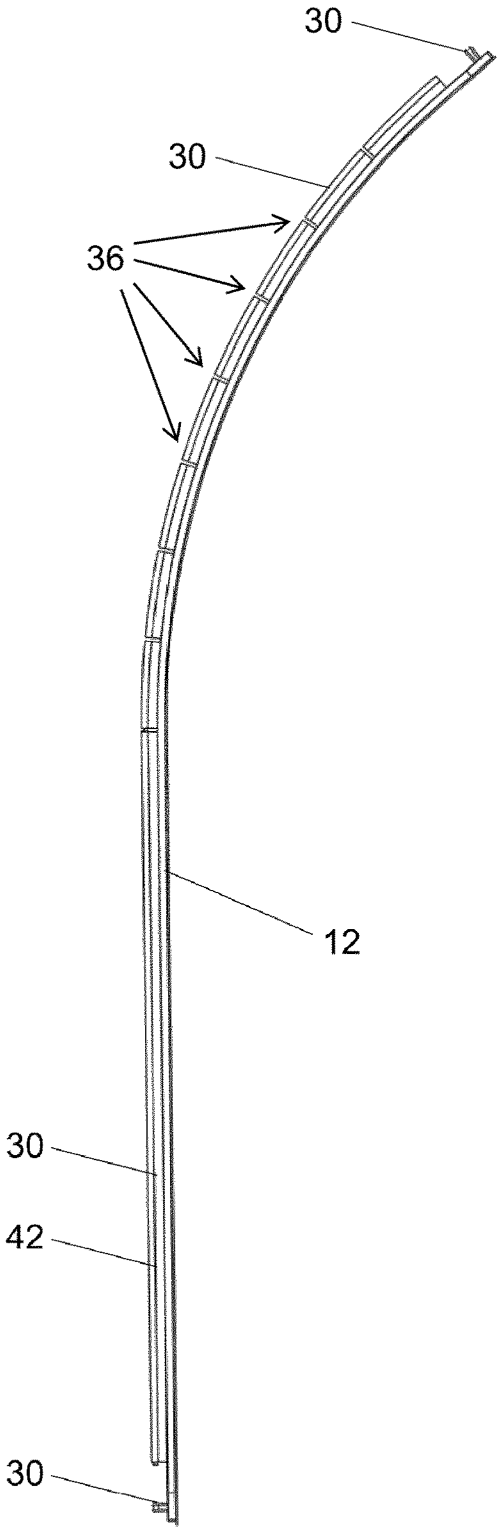
Figure 4:
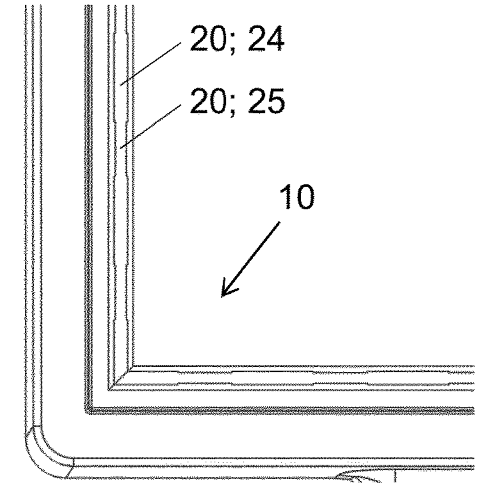
Figure 5:
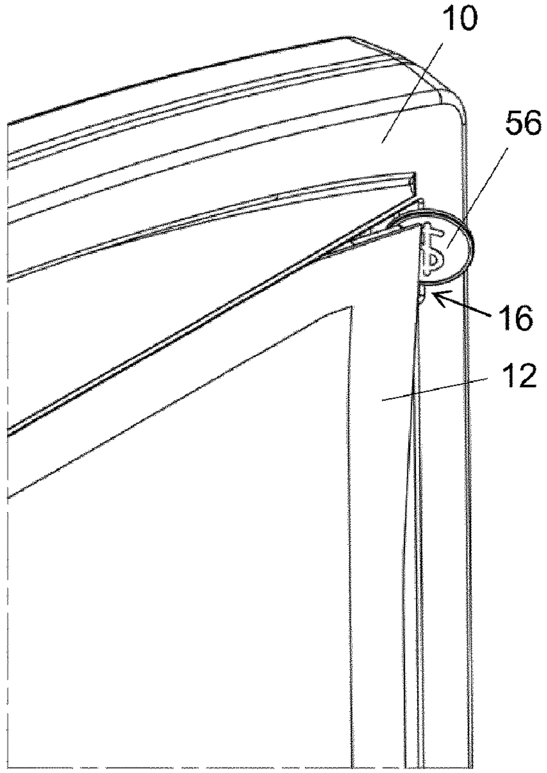
Figure 6:
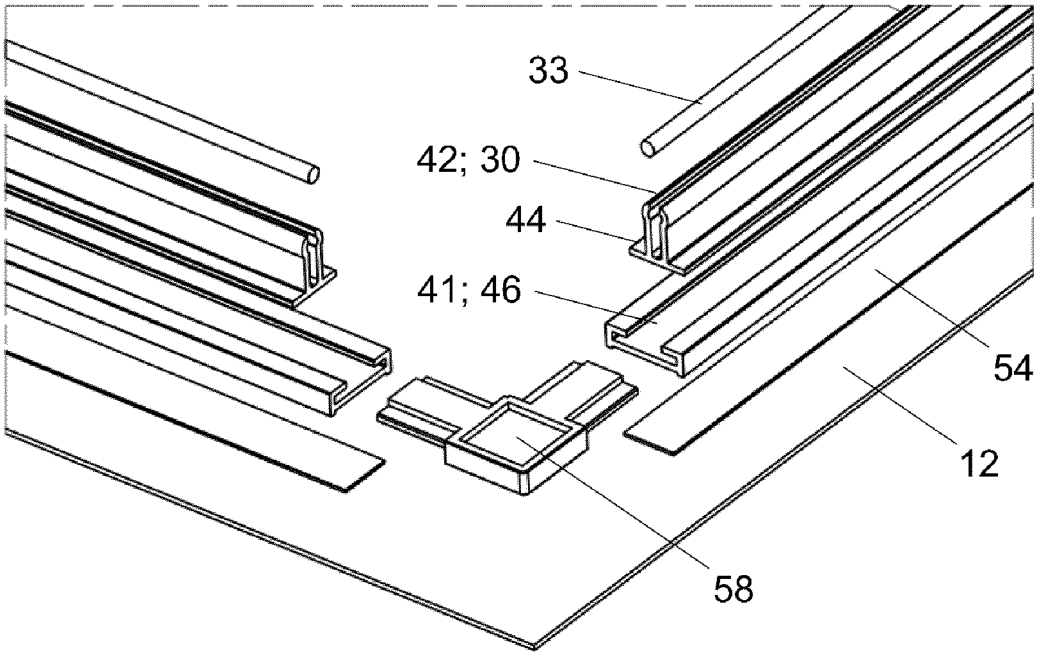
Figure 7:
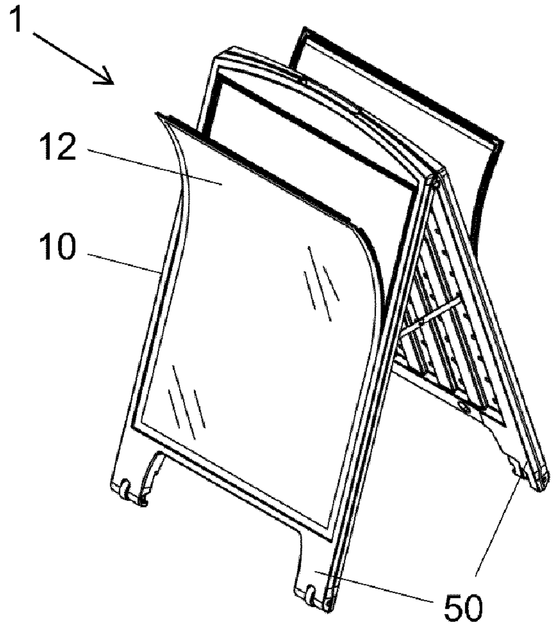

The figures show:

FIG. 1: a perspective view of a poster display device;

FIG. 2: a sectional view of a part of a poster display device;

FIG. 3: a side view of a flexible board;

FIG. 4: a top view of a part of a main body;

FIG. 5: a perspective view of a detail of a poster display device;

FIG. 6: an exploded view of parts of a poster display device;

FIG. 7: another embodiment of a poster display device; and

Figure 8:
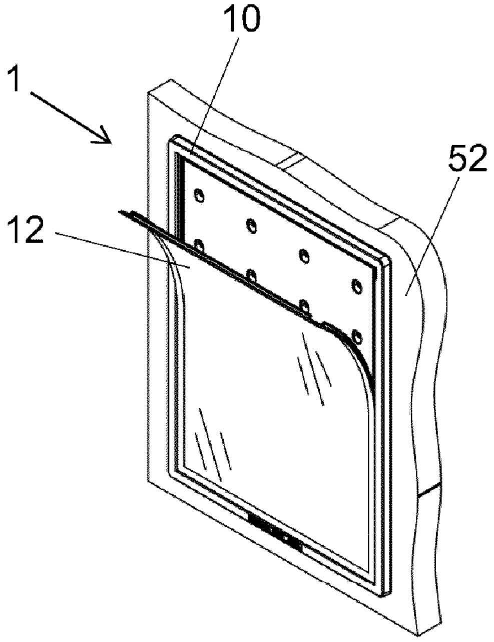

FIG. 8: still another embodiment of a poster display device.

FIG. 1 shows a double-sided stand-up poster display device 1 according to the invention. The device comprises a main body 10 with two surfaces 11 facing in opposite directions for attaching posters. One central standing foot is attached to the main body. The surfaces 11 are enclosed by rectangular frames. Outer sides of a flexible board 12 are attached to the main body 10. The flexible boards 12 are shown in a bent manner, thus depicting their pliability. The shown position is an open position in which the poster 18 can be inserted or removed. In the closed position, each poster 18 is positioned in an internal space limited by the respective surface 11, the flexible board 12 and the frame.

The flexible board 12 is attached to the frames and/or to the main body 10 by elongated plugs 30 which are inserted in plug receivers configured as elongated grooves. The plugs are attached to the flexible board 12 in a circumferential manner. The plugs 30 are attached on the face of the flexible board 12 that faces towards the surface 11 on all four sides of the rectangular flexible board 12. They extend over more than 90% of the circumference of the flexible board 12.

FIG. 2 shows an enlarged sectional side view of a device, in particular the device of FIG. 1, in the region of the lower edge of the flexible board 12 which can be seen on the left-hand side. The internal space 14 is formed between the flexible board 12 and the surface 11 of the main body 10. An extruded first profile 41 is firmly attached to the flexible board 12 by means of a double-sided tape 54. The tape acts as a seal against dirt and humidity. The first profile 41, the flexible board 12 and the surface 11 delimit and enclose the internal space 14.

The first profile 41 forms a receiving space 46 in which a connection section 44 of an also extruded second profile 42 is received and, thus, held. The receiving space 46 has a greater extent in the height direction than the connection section 44 such that the latter can move vertically within the receiving space 46 for approximately 3 mm to compensate for thermal expansion and contraction. The shape of the receiving space 46 and the connection section 44 form a labyrinth seal against intrusion of dirt and humidity into the internal space 14.

The second profile 42 forms the plug 30 which is shown in a position inserted in the plug receiver 21 configured as a groove 20 in FIG. 2. Groove 20 has an undercut 22 and plug 30 has a laterally extended tip 32. This enables a form-fit attachment of the plug 30 in the groove 20 so that the plug 30 cannot be accidentally unplugged against the plugging direction.

The plug 30 is formed of two struts 34 spaced apart from each other which form a space 38 between them. Due to the rounded shape of the extended tip 32 of the plug 30 and the undercut 22 of the groove 20, the space 38 narrows when the struts 34 are pressed together. This occurs for example during plugging of the plug 30 into the groove 20 or unplugging it from the groove 20. A compressible element 33 having an O-shaped cross-section, also referred to as O-ring, is arranged in an accommodating space in a leading region of the space 38 between the struts 34 so as to exert a flexible counter force on the struts 34 when pressed together.

FIG. 3 shows a side view of a flexible board 12 to which an elongated plug 30 is attached in vertical alignment and two elongated plugs 30 are attached in horizontal alignment near the bottom and top edges of the flexible board 12. Each plug 30 is provided by a second profile 42. The vertical plug 30 is subdivided into sections by cutouts 36 arranged at even distances along its longitudinal extension. The cutouts 30 are only provided in the upper region, e.g. approximately in the upper half of the extension of the plug 30. This allows for easily bending the upper part of the flexible board 12 in an outward direction to open the internal space of the device in order to mount or dismount a poster.

FIG. 4 shows a corner of a main body 11 with grooves 20. The grooves 20 have wider sections 24 and narrower sections 25 that alternate. This facilitates partly removing the flexible board as it leads to different plugging forces acting like latching steps.

FIG. 5 shows a flexible board 12 attached to a main body 10, wherein an enlarged gap 16 with a gap width between 2 mm and 3 mm is provided in between. A coin 56 or a similar item is inserted into the gap to pry the flexible board 12 and open the internal space without any tool.

FIG. 6 shows an exploded view of the flexible board 12 and the attached components discussed above relating to FIG. 2. A corner of the flexible board 12 is shown. Between the first profiles 41 attached to the flexible board 12 by means of an adhesive double-sided tape 54, a corner piece 58 is inserted. It is inserted into the receiving spaces 46 of the first profiles 41 after the connection sections 44 of the second profiles 42 have been inserted. The compressible element 33 is a cylindrical element having a circular cross-section.

It can be seen that the plugs 30 are circumferential. Thus, the grooves are also circumferential. Plugs 30 and/or grooves may only be omitted in the corners. Thus, there may be one groove and one plug, which are in particular straight, on each side adjacent the respective outer rim of the flexible board and the surface of the main body, respectively.

FIGS. 7 and 8 show different embodiments of similar poster display devices 1. The device shown in FIG. 7 is a folding-type device having four standing feet 50 and a two-part main body 10. The device shown in FIG. 8 is a wall-mounting device mounted to a wall 52. The main body 10 of the shown device is constituted by a rigid base plate.

LIST OF REFERENCE SIGNS

Poster display device 1
Main body 10
Surface 11
Flexible board 12
Internal space 14
Gap 16
Poster 18
Groove 20
Plug receiver 21
Undercut 22
Wider section 24
Narrower section 25
Plug 30
Tip 32
Compressible element 33
Strut 34
Cutout 36
Space 38
First profile 41
Second profile 42
Connection section 44
Receiving space 46
Standing foot 50
Wall 52
Double-sided tape 54
Coin 56
Corner piece 58

The invention claimed is:

1. A poster display device comprising a main body, a flexible board that is manually bendable at an angle of at least 45 degrees between two opposing ends without breaking, and an internal space for receiving a poster, the internal space being formed between the main body and the flexible board, wherein the flexible board is removably attached to the main body by at least one plug which is plugged into at least one plug receiver.

2. The poster display device according to claim 1, wherein the at least one plug is elongated and/or the at least one plug receiver is an elongated groove which extends over a part of an extent of the internal space.

3. The poster display device according to claim 2, wherein the at least one plug is attached to the flexible board and/or the main body comprises the at least one plug receiver.

4. The poster display device according to claim 3, wherein a first profile is firmly attached to the flexible board and a second profile comprising the at least one plug is attached to the first profile.

5. The poster display device according to claim 4, wherein one of the first profile and the second profile has a connection section and the other one of the first profile and the second profile has a receiving space for receiving the connection section, wherein the receiving space has a first extent in a direction essentially parallel to the flexible board and the connection section has a second extent in the direction of the first extent, wherein the first extent is greater than the second extent.

6. The poster display device according to claim 2, wherein the at least one plug receiver is an elongated groove which extends over at least 70% of the extent of the internal space.

7. The poster display device according to claim 1, wherein the at least one plug is widened at or near its tip and at least one the plug receiver comprises an undercut such that the plug can be held in a form-fit manner in the plug receiver.

8. The poster display device according to claim 1, wherein the at least one plug comprises two struts and a space formed between the struts such that the struts can flexibly deform into the space while plugging the plug in the plug receiver or unplugging the plug from the plug receiver.

9. The poster display device according to claim 8, wherein the at least one plug comprises a compressible element arranged in the space between the two struts for exerting an outwardly-directed counter force onto the struts when the struts are pressed together.

10. The poster display device according to claim 9, wherein the struts run along a main extension direction of the plug.

11. The poster display device according to claim 8, wherein the struts run along a main extension direction of the plug.

12. The poster display device according to claim 1, wherein the at least one plug has cutouts arranged in distances along a longitudinal direction of the plug, wherein the cutouts are in particular aligned essentially perpendicular to the longitudinal direction of the plug.

13. The poster display device according to claim 1, wherein at least one groove has wider sections and narrower sections which alternate along a longitudinal extension of the at least one groove.

14. The poster display device according to claim 1, wherein a gap is provided between the main body and the flexible board, wherein the gap has in a least one location a gap width of at least 2 mm.

15. The poster display device according to claim 1, wherein the at least one plug is attached to the flexible board and/or that the main body comprises the at least one plug receiver.

16. A method for manufacturing a poster display device having a main body, a flexible board which is removably attachable to the main body, and an internal space for receiving a poster, the method comprising providing the main body, the main body comprising at least one groove for receiving at least one plug, providing a flexible board that is manually bendable at an angle of at least 45 degrees between two opposing ends without breaking, performing an extrusion process to form an extruded second profile having at least one plug, and attaching the second profile to the flexible board.

17. The method according to claim 16, wherein the second profile comprises a connection section, the method further comprises performing an extrusion process to form an extruded first profile comprising a receiving space, the step of attaching the second profile comprises firmly attaching the first profile to the flexible board and inserting the connection section into the receiving space to movably attach the second profile to the first profile.

18. The method according to claim 17, wherein the method further comprises removing material from the at least one plug to provide cutouts arranged in distances along a longitudinal direction of the plug.

19. The method according to claim 16, wherein the method further comprises removing material from the at least one plug to provide cutouts arranged in distances along a longitudinal direction of the plug.

* * * * *